United States Patent
Matsuo et al.

(10) Patent No.: US 6,227,953 B1
(45) Date of Patent: May 8, 2001

(54) APPARATUS FOR REMOVING BURR BY MULTIPLE-STAGE GRINDING MACHINE

(75) Inventors: Giichi Matsuo, Yokohama; Hiroshi Fujii, Chigasaki; Koji Okushima, Kamakura, all of (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 09/209,020

(22) Filed: Dec. 10, 1998

(30) Foreign Application Priority Data

Dec. 25, 1997 (JP) .................................................. 9-356718

(51) Int. Cl.⁷ ........................................................ B24B 9/04
(52) U.S. Cl. ........................ 451/190; 451/178; 451/182; 451/194
(58) Field of Search .................................. 451/194, 190, 451/182, 178, 177

(56) References Cited

U.S. PATENT DOCUMENTS

| | | | |
|---|---|---|---|
| 2,918,759 | * 12/1959 | Konazewski et al. ................ | 451/207 |
| 3,667,165 | * 6/1972 | McDowell et al. ................... | 451/127 |
| 3,838,541 | * 10/1974 | Durst et al. ............................ | 451/189 |
| 4,633,620 | * 1/1987 | Lorenzi et al. ............................ | 451/6 |
| 4,777,769 | * 10/1988 | McLaughlin et al. ................... | 451/5 |
| 5,056,972 | * 10/1991 | Burwell et al. ........................ | 409/299 |
| 5,119,600 | * 6/1992 | Chikattsune et al. .................. | 451/21 |
| 5,299,389 | * 4/1994 | Yonaha et al. .............................. | 451/5 |
| 5,709,585 | * 1/1998 | Matsuo et al. ............................ | 451/5 |
| 5,719,368 | * 2/1998 | Okushima et al. ..................... | 219/97 |

FOREIGN PATENT DOCUMENTS

| | | |
|---|---|---|
| 0761331 | 3/1997 | (EP) . |
| 52-43754 | 4/1977 | (JP) . |
| 57-11722 | 3/1982 | (JP) . |
| 09066450A | * 3/1997 | (JP) . |
| 9-66450 | 3/1997 | (JP) . |
| 9-122918 | 5/1997 | (JP) . |

OTHER PUBLICATIONS

Patent Abstracts of Japan, vol. 018, No. 054 (M–1549), Jan. 27, 1994 and JP 05–277916 A (Kawasaki Steel Corp.), Oct. 26, 1993—Abstract; Figure 2.

* cited by examiner

*Primary Examiner*—Allen Ostrager
*Assistant Examiner*—William Hong
(74) *Attorney, Agent, or Firm*—Frishauf, Holtz, Goodman, Langer & Chick, P.C.

(57) ABSTRACT

This apparatus has plural fixed grinding machines, which are installed along the direction of travelling line of billets. Facing pairs of grinders are equipped in a manner that the distances between each facing pair of grinders are gradually shorter along the travelling direction of the billets from the upstream side to the downstream side. In such a multiple-stage grinding machine, the burr on the welded part of the top and bottom side of the billet is ground sequentially by the grinders, and the burr on welded part of the right and left side of the billet is ground sequentially by the grinders.

2 Claims, 2 Drawing Sheets

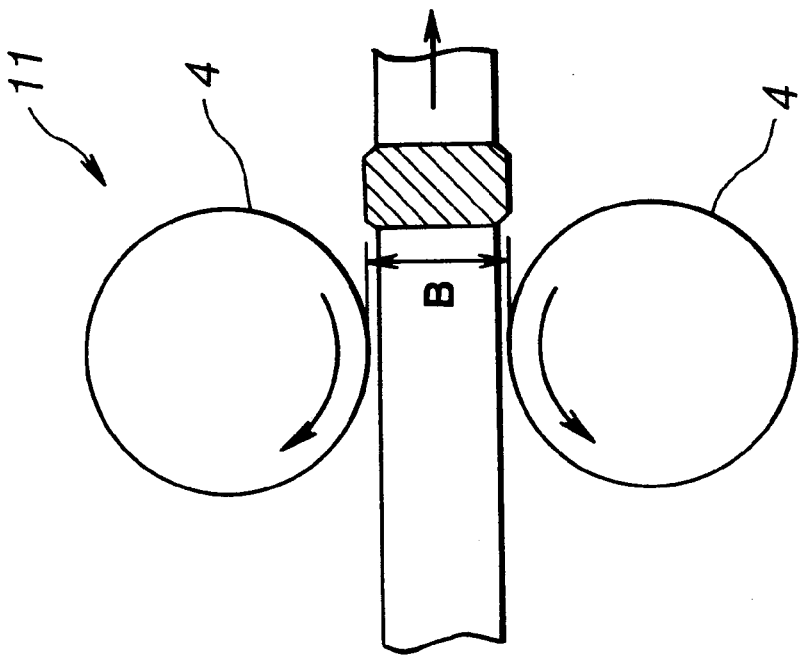
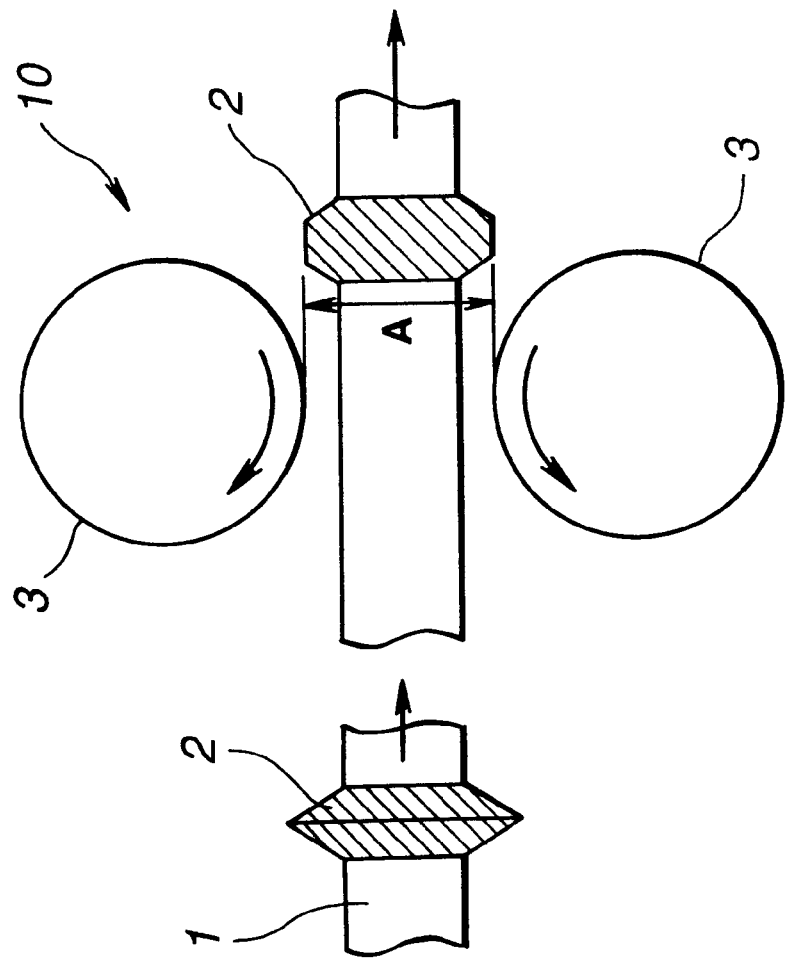
FIG.1A  FIG.1B  FIG.1C

APPARATUS FOR REMOVING BURR BY MULTIPLE-STAGE GRINDING MACHINE

BACKGROUND OF THE INVENTION

1. Field of the Invention

This invention relates to an apparatus of a multiple-stage grinding machine for grinding and removing burrs in a continuous rolling process where billets are joined together by a flash butt welding method.

2. Description of the Related Art

In the continuous rolling process, the successively casting billets are joined together at the inlet of a rolling mill, making use of the flash butt welding method. And then, a contiuous billet can be formed. Finally, the continuous rolling process, what we call, Endless Rolling Process, can be obtained. However, the said process has a possibility to bring about an uplifted welded part with spills (which are caused by an untrimmed laminated part line) and other defects. As a result, the as-welded billet has been rolled without any corrective action. No satisfactory product can be produced in such a way, from a view point of the product quality. Consequently, the burr on the welded part is in need of being removed before being processed by the rolling mill.

In case of a square billet, a burr-removal apparatus has been disclosed in 'unexamined Japanese patent publication No. 52-43754, examined Japanese patent publication No. 57-11722. ' Such a disclosed burr-removal apparatus utilizes formed turning tools or those which face each other against its opposite side, in order to remove the said burr on the welded part. This apparatus has, however, disadvantages of suffering severe abrasion on the turning tool and of spending a lot of time on exchanging the turning tools. By that reason, this apparatus is not suitable for being applied to the continuous rolling process under the usual operating condition of 24 hours continuously.

Furthermore, a method has been known to grind burrs on the welded part by a grinding machine, syncronizing the grinding machine with the travelling billet. (See unexamined Japanese patent publication No. 9-66450, unexamined Japanese patent publication No. 9-122918). However, such a method requires that the grinding machine travel, simultaneously with the travelled billet itself, for a required time (3–10 sec. ) to be grinded. This causes some problems with respect to space-arrangement and the instrumentation control system.

But, in such a continuous rolling process for billets, the grinding method is the most suitable for removing burrs on the welded part because it meets severe operative rolling conditions. In such a case, under the condition of using the travelling grinding machine, the large space for travelling is required. In addition, a complex instrumentation control system is required for synchronizing the grinding machine with travelling speed of billet. On the other hand, the fixed grinding machine does not require a large space nor a complicated control system, but taking its grinding capacity into consideration, a single-stage grinding method cannot deal with the whole of the successively occurring welded parts.

SUMMARY OF THE INVENTION

It is an object of the present invention to provide an apparatus of a multiple-stage-grinding machine for removing burr on the welded part of the billet stepwise with small sized grinders to save space and simplify the control system.

In addition, this apparatus has a technical feature for removing burr on the flash butt welded part in the continuous rolling mill process by the multiple-stage-grinder, wherein the plural fixed grinding machines are located at the different distances between the facing each pair of grinding machines, which are gradually getting shorter along the travelling direction of a billet from upstream to downstream.

It is, also, an apparatus for removing burrs by the multiple-stage grinding machine, wherein an axes of the grinders of the above-mentioned plural fixed grinding machines are located at inclined positions against the direction of billet transferring line.

In the present invention, the plural fixed grinding machines are equipped in a manner that the distances between the each pair of grinding machines, which are facing each other between the upper side and the bottom one of a billet, and between the left side and the right one of the billet, are gradually getting shorter, along the travelling direction of a billet from upstream to downstream. So, the burr on the welded part is ground stepwise in a manner that the continuous billets are passing through each pair of grinders. Therefore, the load on each grinders can be reduced without unreasonable force to the billets. Furthermore, the small size of the grinders makes it possible to save space for the apparatus. And because there is no need for the grinding machines to travel, it is possible to control the apparatus in a simple way.

From another aspect of view, because the axes of the grinders of the plural fixed grinding machines are located at an inclined position against the transferring line, the contacting time with billet and the retreival time for billet can be kept longer. Consequently, the grinded powder from the burrs can easily be dumped, because it cannot be splashed on the billets and on the neighboring grinding machines.

BRIEF DESCRIPTION OF THE DRAWINGS

FIG. 1A is a schematic drawing showing the multiple-stage-grinding method of the present invention, which shows a burr on the welded part in the billet before being dealt with the multiple-stage-grinding machine.

FIG. 1B is a schematic drawing showing the multiple-stage-grinding method of the present invention, which exhibits the situation when the welded billet is passing at the first-stage in the grinding procedure.

FIG. 1C is a schematic drawing showing the multiple-stage-grinding method of the present invention, which exhibits the situation when the welded billet is passing at the second-stage in the grinding procedure.

DESCRIPTION OF THE PREFERRED EMBODIMENT

Figure 2:
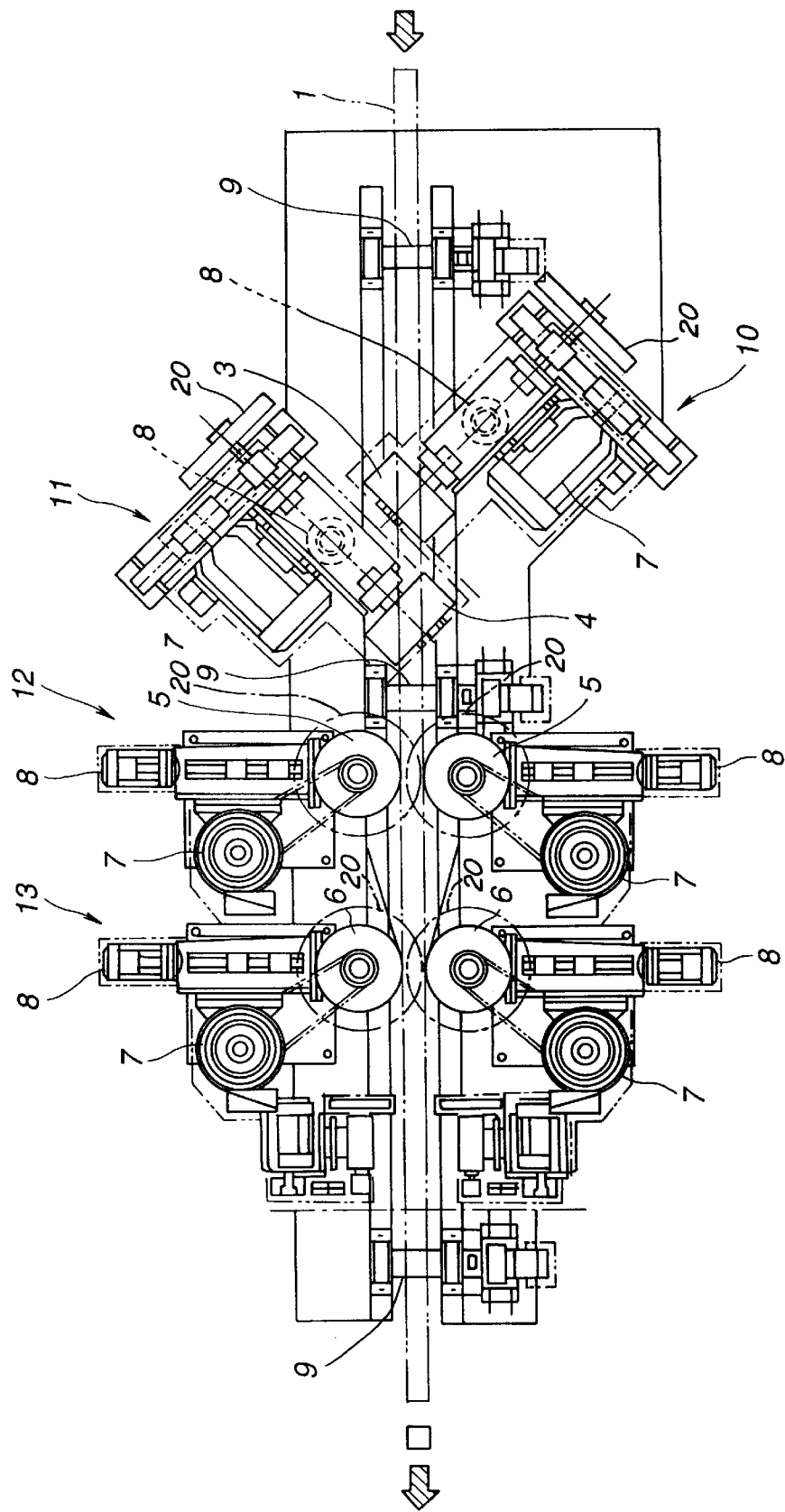
FIG. 2 is a top view of the apparatus for removing burr by multiple-stage grinding machine of the present invention.

FIG. 1A, FIG. 1B and FIG. 1C are schematic drawings of the multiple-stage grinding method of the present invention. Needless to say, the example is not limited to be applied to a manner in this embodiment, although this example shows a two-step grinding method. There is uplifted welded burr 2 on the jointed part of the billets which are welded and joined together by travelling flash butt welding apparatus in the preceding process. In this example, two fixed grinding machines 10 and 11 are installed in the transferring direction of billet 1. And, the distance B between a pair of top and bottom grinder 4 at the second step is set to be smaller than the distance A between a pair of top and bottom grinders 3 at the first step. Because the depth to be ground in each step is set to be almost constant, the burr 2 on the welded part is ground stepwise so as to the height of the burr becomes lower sequentially and the level of burr 2 is almost equal to the surface of billet by passing billet 1 through the first step and the second one of the fixed grinding machines sequentially.

In such a way, the burr on the welded part of top and bottom side has been ground, and then, the burr on the welded parts of the right side and left side are ground and removed in the same process as the multiple-step grinding machines.

The outer diameter of grinders at each step is designed to be the same value. The dimension of the outer diameters is, also, designed to be as small as 300 to 400 mm, in order to make the said apparatus into a smaller size. The effective width of the grinders is a little bit wider than one edge of a billet. Furthermore, the axes of the grinders are preferable to be installed at an inclined position of 30–45 degrees against the direction of transferring line of a billet. By the reason of such inclination, the grinded faces contact with the burrs on the welded faces diagonally. Consequently, the contact time and grinding time with inclination can be longer than those without inclination. The grounded powder from the burr can easily be dumped by the reason of splashing the grounded powder from the burr at some degree toward the billets. Furthermore, such a grinding can be achieved in a moment, so that it enables a motor of the grinding machine to be much smaller, making use of a fly-wheel 20 (see FIG. 2). Therefore, it makes it possible to keep space for the whole apparatus small even when it is a multiple-stage-grinder. In addition, because there is no need for the grinding apparatus to travel, it is possible to keep a rotation speed of the grinders constant. It, also, makes it possible to simplify the instrumentation control system.

FIG. 2 shows a concrete constitution of the apparatus for removing a burr by the multiple-stage-grinder. In this figure, 10 is a fixed grinding machine at the first step, and then 11 is a fixed grinding machine at the second step for grinding the burr on the welded part of the top and bottom side of billet 1. On the downstream side, a fixed grinding machine 12 at the first step and a fixed grinding machine 13 at the second step are installed in the same way, for grinding the burr on the welded part of the right side and left one of billet 1. Although the grinders of the fixed grinding machine 12 and 13 for the right side and left one of billet 1 are graphically designed in parallel with billet 1, the axes of the grinders are actually located at an inclined position against the direction of 10 and 11 for the top and bottom side of billet 1. The fixed grinding machine of each step are equipped with a pair of grinders 3 and 4 for the top and bottom, and a pair of grinders 5 and 6 for the right side and the left side, respectively. The grinders can be rotated by the grinding motor 7. Furthermore, the distance between grinders 4 in the downstream direction is set to be smaller than that of the facing pair of grinders 3 for the top and bottom in the upstream direction. The distance between facing pair of grinders 6 for the right side and left side in the downstream direction is set to be smaller than that of the facing pair of grinders 3 for the top and bottom in the upstream direction in the same way. Although these distances of the grinders can be adjusted automatically by the geared motor 8 for adjusting distance, they can be adjusted manually. Manual adjustment is rather enough and suitable, judging from a point of reducing cost and from the small sized-apparatus.

The operation of the apparatus for removing a burr by multiple-stage grinder can be obtained as mentioned above.

Describing the operation in detail, at first, the billet 1 welded by the flash butt welding method is transferred to the apparatus of this invention. Secondarily, the burr on the welded part of the top and bottom side of billet 1 are ground sequentially by the grinders 3 and 4 of the two fixed grinding machines 10 and 11, in order to make the height of the burr lower. Thirdly, the burr on the welded part of the right and left side of billet 1 is ground sequentially by the grinding stones 5 and 6 of the two fixed grinding machines 12 and 13. After the burr on the welded part is ground, the billet is transferred to the rolling mills to roll the billet continuously.

Although the order of grinding the burr on the welded part is from the top and bottom of side to the right and left side of a billet in the above-example, it is possible to reverse the order, naturally. Unless otherwise, it is possible to grind the burr on the welded part of from the top and bottom side and to the right and left side, one after the other.

As mentioned above, the present invention has an apparatus that plural grinders of the fixed grinding machines are installed in a manner that the distances between each facing pair of grinders is gradually shorter along the travelling direction of a billet from the upstream to the downstream and the burr on the welded part is ground stepwise.

Therefore, it becomes possible to save large space for the apparatus, in comparison with the travelling grinder. By that reason, the instrumentation control system of the apparatus can be simpler. The load on each grinding step can be reduced. The size of the apparatus can be smaller. Unnecessary force can be reduced.

Furthermore, the contact time with billet and the retreival time for grinding can be longer. And the slag can easily be dumped by installing the axes of the grinders of each grinding step at an inclined position against the transferring line.

What is claimed is:

1. An apparatus for removing burrs on a welded part in a billet where billets are joined together by flash butt welding in a continuous rolling process, said apparatus comprising:

at least two fixed grinding machines, including a first fixed grinding machine and a second fixed grinding machine;

a first pair of facing grinders which are located in said first fixed grinding machine and which are separated by a distance A;

a second pair of facing grinders which are located in said second fixed grinding machine and which are separated by a distance B;

wherein the distance B is shorter than the distance A along a travelling direction of the billet from an upstream side to a downstream side;

wherein rotational axes of the grinders in said at least two fixed grinding machines are installed at an inclined position against a direction of a travelling line of the billet; and wherein the grinding machines are adapted to be driven by a motor that makes use of a fly-wheel, and grinding is achieved in a moment as the billet passes through the grinding machines.

2. The apparatus of claim 1, wherein the axes of the grinders are inclined at an angle of 30–45 degrees against the direction of the travelling line of the billet.

* * * * *

UNITED STATES PATENT AND TRADEMARK OFFICE
CERTIFICATE OF CORRECTION

PATENT NO. : 6,227,953 B1
DATED : May 8, 2001
INVENTOR(S) : Giichi Matsuo et al.

It is certified that error appears in the above-identified patent and that said Letters Patent is hereby corrected as shown below:

<u>Title page</u>
Item [45], Date of Patent, before "May 8, 2001" insert -- * --;

Item [*], Notice, before "Subject" insert:
 -- This patent issued on a continued
 prosecution application filed under 37
 CFR 1.53(d), and is subject to the twenty
 year patent term provisions of 35 U.S.C. 154 (a) (2). --.

Signed and Sealed this

Third Day of September, 2002

*Attest:*

*Attesting Officer*

JAMES E. ROGAN
*Director of the United States Patent and Trademark Office*